(12) United States Patent
Kim et al.

(10) Patent No.: US 12,160,179 B2
(45) Date of Patent: Dec. 3, 2024

(54) AC/DC CONVERTER

(71) Applicant: LG INNOTEK CO., LTD., Seoul (KR)

(72) Inventors: Soo San Kim, Seoul (KR); Seung Min Lee, Seoul (KR); Jae Yeop Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 213 days.

(21) Appl. No.: 17/782,092

(22) PCT Filed: Nov. 17, 2020

(86) PCT No.: PCT/KR2020/016203
§ 371 (c)(1),
(2) Date: Jun. 2, 2022

(87) PCT Pub. No.: WO2021/112451
PCT Pub. Date: Jun. 10, 2021

(65) Prior Publication Data
US 2023/0006569 A1    Jan. 5, 2023

(30) Foreign Application Priority Data
Dec. 3, 2019 (KR) .................. 10-2019-0159169

(51) Int. Cl.
*H02M 7/219* (2006.01)
*B60L 53/22* (2019.01)
*H02M 1/44* (2007.01)

(52) U.S. Cl.
CPC ............. *H02M 7/219* (2013.01); *B60L 53/22* (2019.02); *H02M 1/44* (2013.01)

(58) Field of Classification Search
CPC .......... H02M 7/219; H02M 1/44; B60L 53/22
USPC .......................................... 363/44
See application file for complete search history.

(56) References Cited

U.S. PATENT DOCUMENTS

| | | | |
|---|---|---|---|
| 8,338,982 B2 * | 12/2012 | Duan | G06F 1/26 307/29 |
| 10,654,373 B2 * | 5/2020 | Kim | H02M 1/126 |
| 2019/0299793 A1 * | 10/2019 | Kim | H02M 1/4233 |
| 2020/0321796 A1 * | 10/2020 | Chang | H02M 1/10 |

FOREIGN PATENT DOCUMENTS

| | | | | |
|---|---|---|---|---|
| AU | 2008310358 A1 * | 4/2010 | | H02M 1/126 |
| AU | 2008310358 B2 | 2/2011 | | |
| CN | 109889077 A | 6/2019 | | |
| JP | 2006-34000 A | 2/2006 | | |
| JP | 2011-199978 A | 10/2011 | | |
| JP | 6038934 B2 | 12/2016 | | |
| WO | WO 2018/158040 A1 | 9/2018 | | |

* cited by examiner

*Primary Examiner* — Yemane Mehari
(74) *Attorney, Agent, or Firm* — Birch, Stewart, Kolasch & Birch, LLP

(57) ABSTRACT

The AC/DC converter according to one embodiment of the present invention comprises: a power unit comprising a plurality of power input lines; a main bridge circuit into which input power is input via the power unit; a relay connected in parallel to both ends of any one of the power input lines; and a control unit for controlling the opening/closing of the relay on the basis of the type of input power.

7 Claims, 9 Drawing Sheets

AC/DC CONVERTER

CROSS REFERENCE TO RELATED APPLICATIONS

This application is the National Phase of PCT International Application No. PCT/KR2020/016203, filed on Nov. 17, 2020, which claims priority under 35 U.S.C. 119(a) to Patent Application No. 10-2019-0159169, filed in the Republic of Korea on Dec. 3, 2019, all of which are hereby expressly incorporated by reference into the present application.

TECHNICAL FIELD

The present invention relates to an AC/DC converter, and more particularly, to an AC/DC converter in which input powers can be interchanged.

BACKGROUND ART

General vehicles obtain the driving force required for driving entirely through the combustion of petroleum fuel (gasoline or diesel). An eco-friendly vehicle refers to a vehicle that generates some or all of the driving force by using an energy source (electricity) other than petroleum fuel, and it has the advantage of high fuel efficiency and low emissions when compared to general vehicles.

Among these eco-friendly vehicles, an electric vehicle has a high-voltage battery that supplies electricity to a motor for driving, and the high-voltage battery can be charged quickly with a quick charger or charging is accomplished by being connected to general AC power through an on-board charger (OBC) installed inside the vehicle.

The AC/DC converter of the on-board charger has a problem that, since the circuit for three-phase power and the circuit for single-phase power are different, only one type of power must be used depending on the circuit already manufactured, and it is impossible to respond to various power sources.

In addition, since the power provided through an on-board charger varies greatly depending on the country where the on-board charger is installed, there is a problem that on-board chargers for a three-phase power and a single-phase power must be individually manufactured depending on country or type of input power.

DETAILED DESCRIPTION OF THE INVENTION

Technical Subject

The technical problem to be solved by the present invention is to provide an AC/DC converter in which input powers can be interchanged.

The problems of the present invention are not limited to the above-mentioned problems, and other problems not mentioned will be clearly understood by those skilled in the art from the following description.

Technical Solution

In order to solve the above technical problem, an AC/DC converter according to an embodiment of the present invention comprises: a power unit comprising a plurality of power input lines; a main bridge circuit into which input power is being inputted via the power unit; a relay connected in parallel to both ends of any one of the power input lines; and a control unit controlling the opening/closing of the relay on the basis of the type of the input power.

In addition, the power unit may include three power input lines.

In addition, the relay may become open when a three-phase power is inputted to the power unit.

In addition, the relay may become closed when a single-phase power or a two-phase power is inputted to the power unit.

In addition, the relay is connected to any one among the power input lines not being inputted with an input power when a single-phase power or the two-phase power is inputted to the power unit.

In addition, the main bridge circuit includes a plurality of half-bridge circuits including two switch elements connected in series and a node connected between the two switch elements, wherein the plurality of half-bridge circuits are connected in parallel to each other and each node of the plurality of half-bridge circuits may be respectively connected to the power input line.

In addition, it may include a plurality of inductors being connected between each node of the plurality of half-bridge circuits and the power input line.

In addition, it may include a capacitor connected in parallel with the main bridge circuit.

In addition, it may include a filter for removing noise of the input power being inputted to the power unit.

In order to solve the above technical problem, an AC/DC converter according to another embodiment of the present invention includes: a power unit including a plurality of power input lines and a neutral line; a main bridge circuit being inputted with the input power through the power unit; a switch selectively connecting any one among the plurality of power input lines and the neutral line to the main bridge circuit; and a control unit controlling the connection of the switch on the basis of the type of the input power.

In addition, the power unit may include three power input lines.

In addition, the switch may connect any one among the power input lines and the main bridge circuit when three-phase power is inputted to the power unit.

In addition, the switch may connect the neutral line and the main bridge circuit when single-phase power or two-phase power is inputted to the power unit.

In addition, the switch may selectively connect any one among the plurality of power input lines and the neutral line not being inputted with the input power when a single-phase power or a two-phase power is inputted to the power unit.

In addition, the main bridge circuit includes a plurality of half-bridge circuits including two switch elements being connected in series a node being connected between and the two switch elements, wherein the plurality of half-bridge circuits are connected in parallel to each other, and wherein each node of the plurality of half-bridge circuits may be respectively connected to the power input line or the neutral line.

In addition, it may include a plurality of inductors being connected between each node of the plurality of half-bridge circuits and the power input line or the neutral line.

In addition, it may include a capacitor connected in parallel with the main bridge circuit.

Advantageous Effects

According to embodiments of the present invention, it is possible to charge the battery with a power supplied in various forms without a separate manipulation or device.

In addition, since it can be used interchangeably with various types of power sources, model management and inventory management can be performed more efficiently than when it is produced for a three-phase power or a single-phase power. In addition, when a single-phase power supply is inputted, two half-bridge circuits can be used, making it possible to implement products with high power efficiency and power density. Furthermore, since fewer elements are used than the conventional AC/DC converter for three-phase power, a thin and light-weight product can be manufactured and the manufacturing cost can be reduced.

The effect according to the present invention is not limited by the contents exemplified above, and more various effects are included in the present specification.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
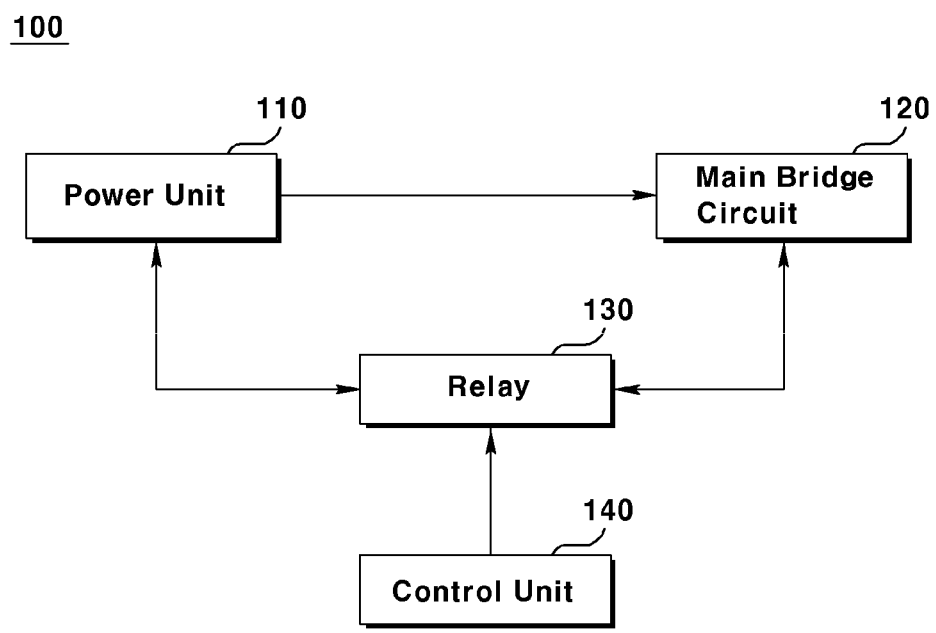
FIG. 1 is a block diagram of an AC/DC converter according to an embodiment of the present invention.
Figure 2:
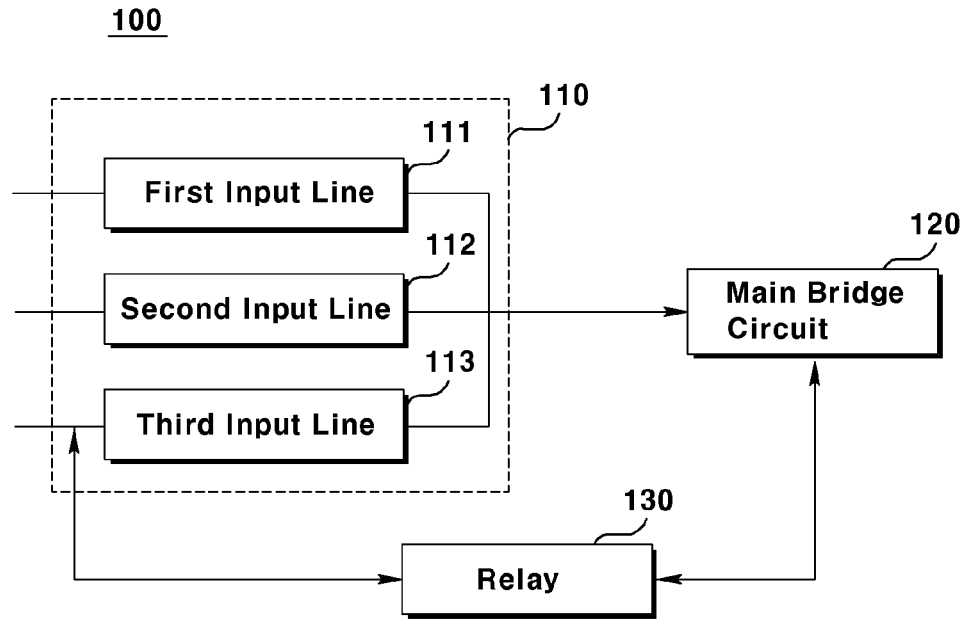
FIGS. 2 to 4 are block diagrams of an AC/DC converter according to another embodiment of the present invention.
Figure 3:
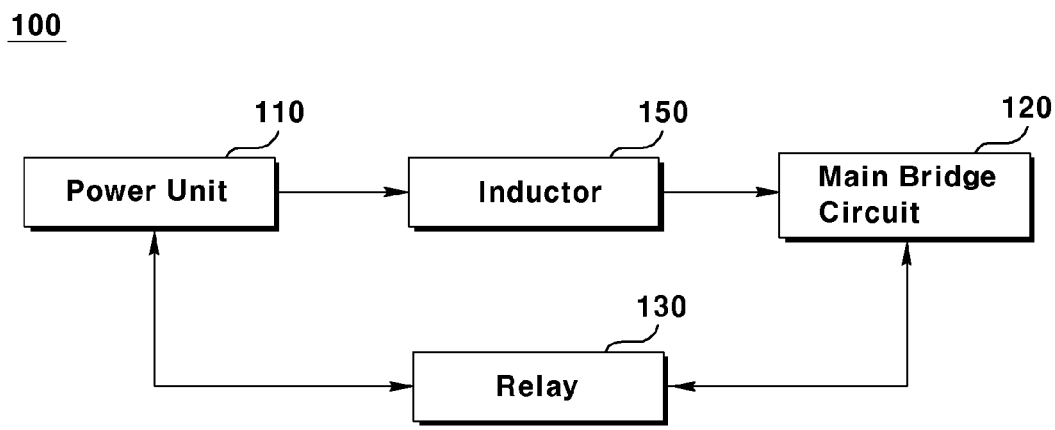
Figure 4:
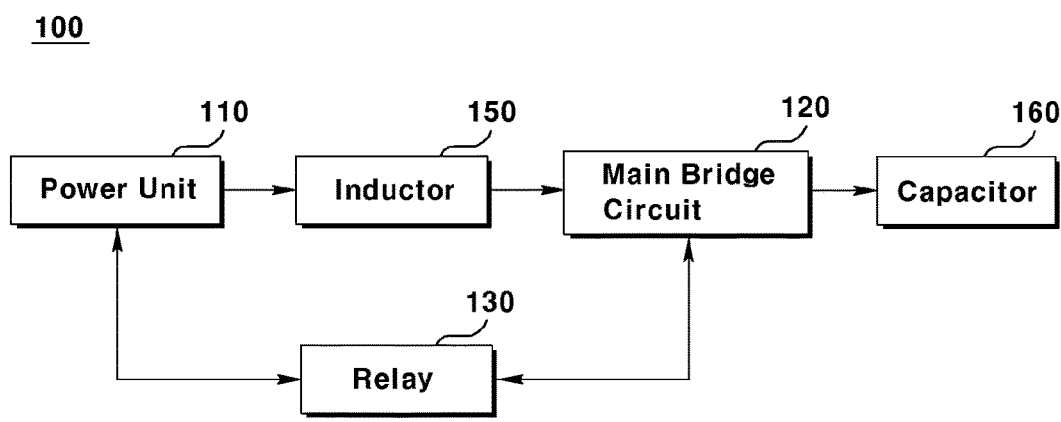

FIG. 1 is a block diagram of an AC/DC converter according to an embodiment of the present invention, and FIGS. 2 to 4 are block diagrams of an AC/DC converter according to another embodiment of the present invention.

An AC/DC converter 100 according to an embodiment of the present invention comprises a power unit 110, a main bridge circuit 120, a relay 130, and a controller 140, and may further include an inductor 150, a capacitor 160, and a filter (not shown).

The power unit 110 is inputted with a power and includes a plurality of power input lines.

More specifically, the power unit 110 is inputted with a power for charging the battery from the outside of the AC/DC converter 100. At this time, various types of power may be inputted to the power unit 110. For example, an input power being inputted to the power unit 110 may be a three-phase power, a two-phase power, or a single-phase power.

A three-phase power supply is supplied by dividing the voltage of the supply power into three voltages, and the three voltages have different phases, so it is called a three-phase asymmetric power supply. Three-phase power is used in Korea, North America, and Europe.

A two-phase power supply is called a two-phase symmetric power supply because the voltage of a supply power is divided into two voltages, and the two voltages have opposite phases. Two-phase power is mainly used in North America.

A single-phase power supply is called a single-phase asymmetric power supply because the voltage of the supply power is supplied in the form of a single voltage of a single phase, and the single voltage has a single phase. Single-phase power is mainly used in Korea, North America, and Europe.

As illustrated in FIG. 2, the power unit 110 may include a first power input line 111, a second power input line 112, and a third power input line 113, and each power input line Power may be input to 111, 112, and 113 from the outside. For example, when a three-phase power is inputted to the power unit 110, the first power input line 111, the second power input line 112, and the third power input line 113 may be inputted respectively, and, when a single-phase power or a two-phase power is inputted to the power unit 110, power may not be inputted to at least one of the power input lines 111, 112, and 113.

The main bridge circuit 120 is inputted with a power from the power unit 110.

More specifically, a main bridge circuit 120 is inputted with a power being inputted to the power unit 110 from the outside of an AC/DC converter 100. The main bridge circuit 120 may include a plurality of elements or components for the operation of the AC/DC converter 100.

The main bridge circuit 120 may include a plurality of half-bridge circuits including two switch elements connected in series and a node connected between the two switch elements.

Each half-bridge circuit is configured using two switches, and a node may be formed between the two switch elements. For example, a first-first switch element 121 and a first-second switch element 122 comprise a first half-bridge circuit; a second-first switch element 124 and a second-second switch element 125 comprise a second half-bridge circuit; and a third-first switch element 127 and a third-second switch element 128 may comprise a third half-bridge circuit. The first half-bridge circuit may include a first node 123, the second half-bridge circuit may include a second node 126, and the third half-bridge circuit may include a third node 129.

The plurality of half-bridge circuits may be connected to each other in parallel, and each node of the plurality of half-bridge circuits may be respectively connected to the power input line. For example, both ends of each circuit of a first half-bridge circuit, a second half-bridge circuit, and a third half-bridge circuit, are connected in parallel to form the main bridge circuit 120, and a node formed in each half-bridge circuit 123, 126, and 129 may be connected to each of the power input lines 111, 112, and 113. The first node 123 is connected to the first power input line 111, the second node 126 is connected to the second power input line 112, and the third node 129 may be connected to the third power input line 113.

According to another embodiment of the present invention, the main bridge circuit 120 may include an inductor 150 as shown in FIG. 3.

The inductor 150 may be connected between each node of the plurality of half-bridge circuits and a power input line. For example, a first inductor 151 may be included between the first power input line 111 and the first node 123; a second inductor 152 may be included between the second power input line 112 and the second node 126; and a third inductor 153 may be included between the third power input line 113 and the third node 128.

The inductor 150 may remove a ripple of the input power being inputted to the power unit 110 or improve a partial waveform, and enable a power to be stably inputted to the main bridge circuit 120. Or, the inductor 150 may function as a filter together with the capacitor.

According to another embodiment of the present invention, the main bridge circuit 120 may include a capacitor 160 as shown in FIG. 4.

The capacitor 160 may be connected in parallel to both ends of the main bridge circuit 120. As a storage element, the capacitor 160 may store power for a certain period of time to stably supply it to the battery, and may function as a filter together with the inductor.

The relay 130 is connected in parallel to both ends of any one among the plurality of power input lines.

More specifically, the relay 130 is connected in parallel to both ends of any one among the plurality of power input lines and is open or closed; when the relay 130 is open, power does not flow; and power may flow when the relay 130 is closed.

The relay 130 is open when a three-phase power is inputted to the power unit 110; when a single-phase power or a two-phase power is inputted to the power unit 110, it is closed by being connected to any one of the power input lines 111, 112, and 113 not being inputted with a power. For example, when a single-phase power or a two-phase power is inputted to the power unit 110, the relay 130 connected in parallel to both ends of the third power input line 113 not being inputted with a power may be closed.

The control unit 140 controls opening and closing of the relay 130 based on the type of an input power.

More specifically, the control unit 140 detects the type of an input power being applied to the power unit 110 or receives information on the type of the input power being applied, and based on the type of the input power, opening and closing of the relay 130 can be controlled. For example, the control unit 140 controls the relay 130 to be open when an input power being applied to the power unit 110 is a three-phase power, and the relay 130 connected to any one among the power input lines 111, 112, and 113 not being inputted with an input power is closed when the input power applied to the power unit 110 is a single-phase power or a two-phase power.

According to another embodiment of the present invention, a filter (not shown) may be included.

The filter may be an EMI filter, and may remove noise included in the input power inputted to the power unit 110. The filter may be included between the power unit 110 and the main bridge circuit 120 or included in the main bridge circuit 120.

Figure 5:
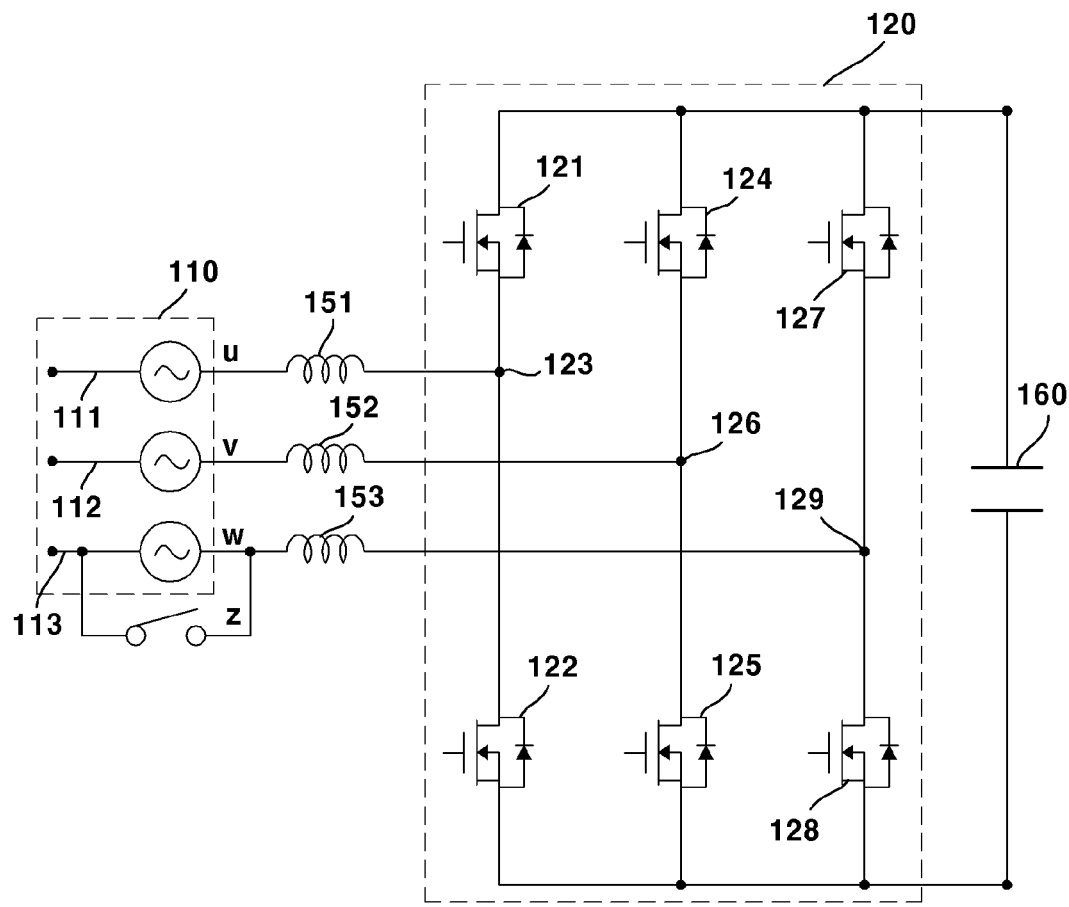
FIGS. 5 and 6 are diagrams for explaining an operation process of an AC/DC converter according to an embodiment of the present invention.

FIG. 5 is a diagram for explaining the operation of an AC/DC converter 100 when a three-phase power is inputted to the power unit 110.

When a three-phase power is inputted to the power unit 110, each of the three power sources having different phases is inputted to a first power input line 111, a second power input line 112, and a third power input line 113. At this time, the relay 130 connected in parallel to the third power input line 113 is open.

The input power inputted to the power unit 110 is delivered to the main bridge circuit 120 through each of the power input lines 111, 112, and 113, and delivered to the capacitor 160 as one of the two switch elements comprising the half-bridge circuit is turned on.

For example, the input power inputted to the first power input line 111 flows to the first node 123, the first-first switch element 121 comprising the first half-bridge circuit is turned on, and a first-second switch element 122 is turned off so that the input power being inputted through the first power input line 111 is delivered to the capacitor 160 through the first-first switch element 121. The input power being inputted to the second power input line 112 and the third power input line 113 is also delivered to the capacitor 160 like the input power being inputted to the first power input line 111.

Figure 6:
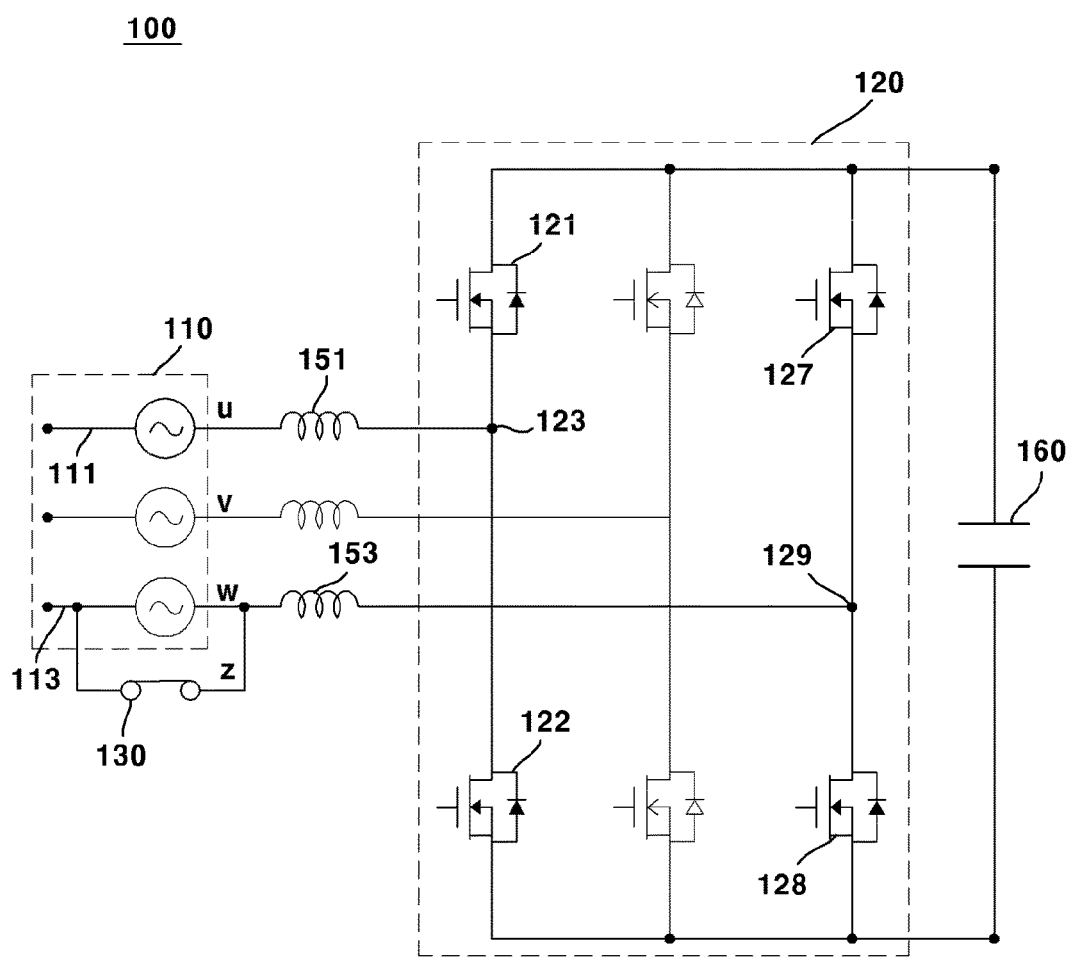

FIG. 6 is a diagram for explaining the operation of an AC/DC converter 100 when a single-phase power or a two-phase power is inputted to the power unit 110.

When a single-phase power is inputted to the power unit 110, the input power may be inputted through the first power input line 111, and when two-phase power is inputted to the power unit 110, each of the two power sources having different phases may be inputted to the first power input line 111 and the second power input line 112. At this time, no input power may be inputted to the third power input line 113.

More specifically, FIG. 6 illustrates a case in which a single-phase power is inputted to the power unit 110, and the shaded part is a part that does not operate because the input power is not inputted.

When a single-phase power is inputted to the power unit 110, it is delivered to the main bridge circuit 120 through the first power input line 111, and delivered to the capacitor 160 as one of the two switch elements comprising the first half-bridge circuit is turned on. The power passing through the capacitor 160 is delivered to the third power input line 113 when one of the two switches comprising the third half-bridge circuit is turned on. At this time, the relay 130 connected in parallel to the third power input line 113 is closed so that a power can flow.

For example, the input power inputted to the first power input line 111 flows to a first node 123, the first-first switch element 121 constituting the first half-bridge circuit is turned on, the first-second switch element 122 is turned off, so that the input power inputted through the first power input line 111 is transferred to the capacitor 160 through the first-first switch element 121. After that, the third-first switch element 127 constituting the third half-bridge circuit is turned off, the third-second switch element 128 is turned on, so that the power passing through the capacitor 160 flows to the third power input line 113 through the third-second switch element 128. At this time, the relay 130 is closed so that a power can flow.

That is, when single-phase power is inputted to the power unit 110 in an AC/DC converter 100 according to the embodiment of the present invention, since it operates using two half-bridge circuits, the voltage that one half-bridge has to handle can be reduced and also the power density and power efficiency can be increased.

Figure 7:
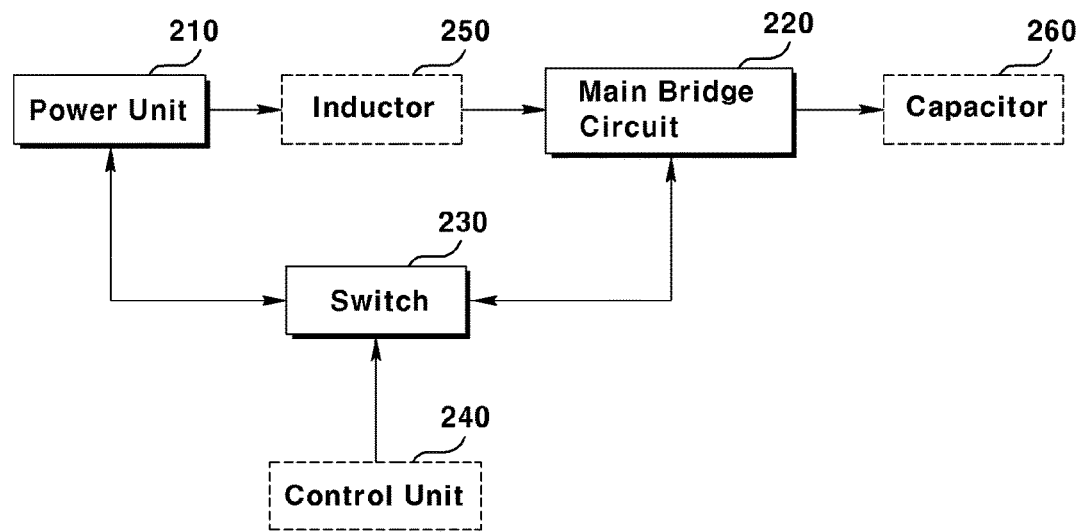
FIGS. 7 and 8 are block diagrams of an AC/DC converter according to another embodiment of the present invention.
Figure 8:
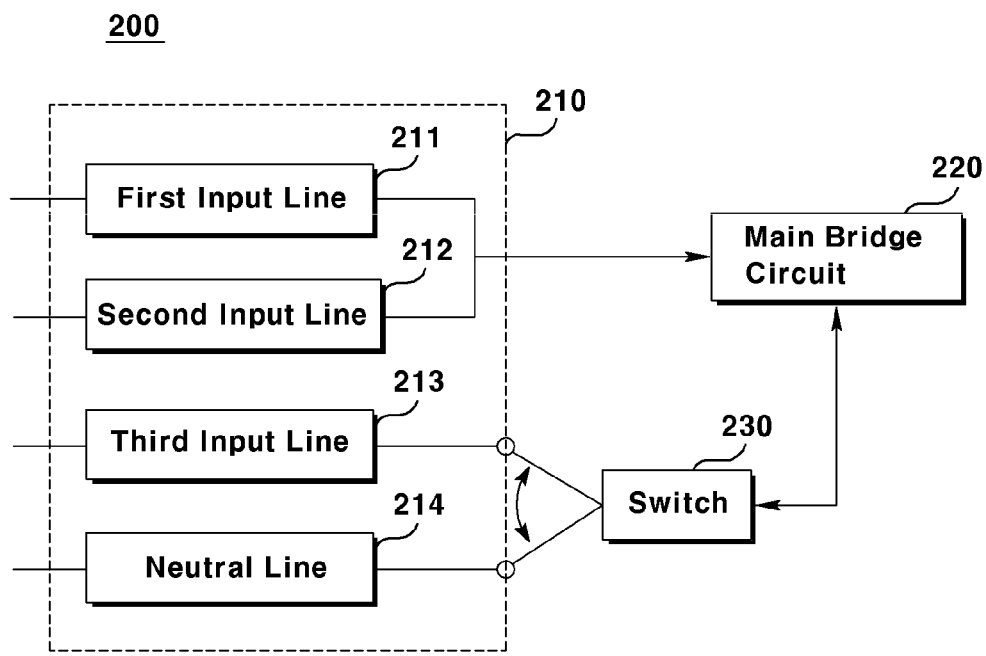

FIGS. 7 and 8 are block diagrams of an AC/DC converter 200 according to another embodiment of the present invention.

Since the detailed description of an AC/DC converter 200 according to another embodiment of the present invention corresponds to the detailed description of an AC/DC converter 100 described with reference to FIGS. 1 to 6, overlapping descriptions other than the configuration different from those of an AC/DC converter 100 described previously will be omitted.

An AC/DC converter 200 according to another embodiment of the present invention includes a power unit 210, a main bridge circuit 220, a switch 230, and a control unit 240, and may further include an inductor 250, a capacitor 260, and a filter (not shown).

The power unit 210 is inputted with a power and includes a plurality of power input lines and a neutral line.

More specifically, the power unit 210 may be inputted with a power for charging the battery from the outside of the AC/DC converter 200, and various types of power may be inputted. For example, the input power inputted to the power unit 210 may be a three-phase power, a two-phase power, or a single-phase power.

The power unit 210 may include a first power input line 211, a second power input line 212, a third power input line 213, and a neutral line 214; and each of the power input lines 211, 212 and 213 may be inputted with a power from the outside, and the neutral line 214 may be grounded.

The main bridge circuit 220 is inputted with an input power from the power unit 210.

More specifically, the main bridge circuit 220 receives a power inputted to the power unit 210 from the outside of an AC/DC converter 200. The main bridge circuit 220 may include a plurality of elements or components for the operation of the AC/DC converter 200.

The main bridge circuit 220 includes two switch elements connected in series and a plurality of half-bridge circuits including a node connected between the two switch elements, wherein the plurality of half-bridge circuits are connected in parallel to each other, and wherein each node of the plurality of half-bridge circuits may be respectively connected to the power input line or the neutral line.

For example, a first node 223 is connected to the first power input line 211, a second node 226 is connected to the second power input line 212, and a third node 229 may be connected to the third power input line 213 or the neutral line 214.

According to another embodiment of the present invention, the main bridge circuit 220 may include an inductor 250 as shown in FIG. 7.

The inductor 250 may be connected between each node of the plurality of half-bridge circuits and a power input line or a neutral line. For example, the first inductor 251 may be included between the first power input line 211 and the first node 223; a second inductor 252 may be included between the second power input line 212 and the second node 226; and a third inductor 253 may be included between the switch 230 and the third node 229 or between the third power input line 213 and the switch 230 or between the neutral line 214 and switch 230.

According to another embodiment of the present invention, the main bridge circuit 220 may include a capacitor 260 or a filter (not shown) as shown in FIG. 7.

The switch 230 selectively connects any one of a plurality of power input lines and a neutral line to the main bridge circuit.

More specifically, the switch 230 is adjusted so that any one of the plurality of power input lines and the neutral line is connected to the main bridge circuit 220; the input power input to the power unit 210 is delivered to the main bridge circuit 220 when the switch 230 connects the power input line and the main bridge circuit 220; and a power inputted to the main bridge circuit 220 flows out through the neutral line 214 when the switch 230 connects the neutral line 214 and the main bridge circuit 220.

The switch 230 connects any one among the power input lines 211, 212 and 213 and the main bridge circuit 220 when a three-phase power is inputted to the power unit 210, and may connect the neutral line 214 and the main bridge circuit 220 when a single-phase power or a two-phase power is inputted to the power unit 210.

At this time, when a single-phase power or a two-phase power is inputted to the power unit 210 among the plurality of power input lines 211, 212 and 213, any one of the power input line and the neutral line 214 not being inputted with an input power may be selectively connected to the main bridge circuit 220. For example, when a single-phase power or a two-phase power is inputted to the power unit 210, no input power is inputted to the third power input line 213, and when a three-phase power is inputted to the power unit 210, the switch 230 may connect the third power input line 213 and the main bridge circuit 220.

The control unit 240 controls the connection of the switch 230 based on the type of input power.

More specifically, the control unit 240 may control the connection of the switch 230 based on the type of input power by detecting the type of input power applied to the power unit 210 or receiving information about the type of input power applied. For example, the control unit 240 controls the switch 230 to connect any one among the power input lines 211, 212 and 213 and the main bridge circuit 220 when the input power applied to the power unit 210 is a three-phase power, and may control the switch 230 to connect the neutral line 214 and the main bridge circuit 220 when the input power applied to the power unit 210 is a single-phase power or a two-phase power.

Figure 9:
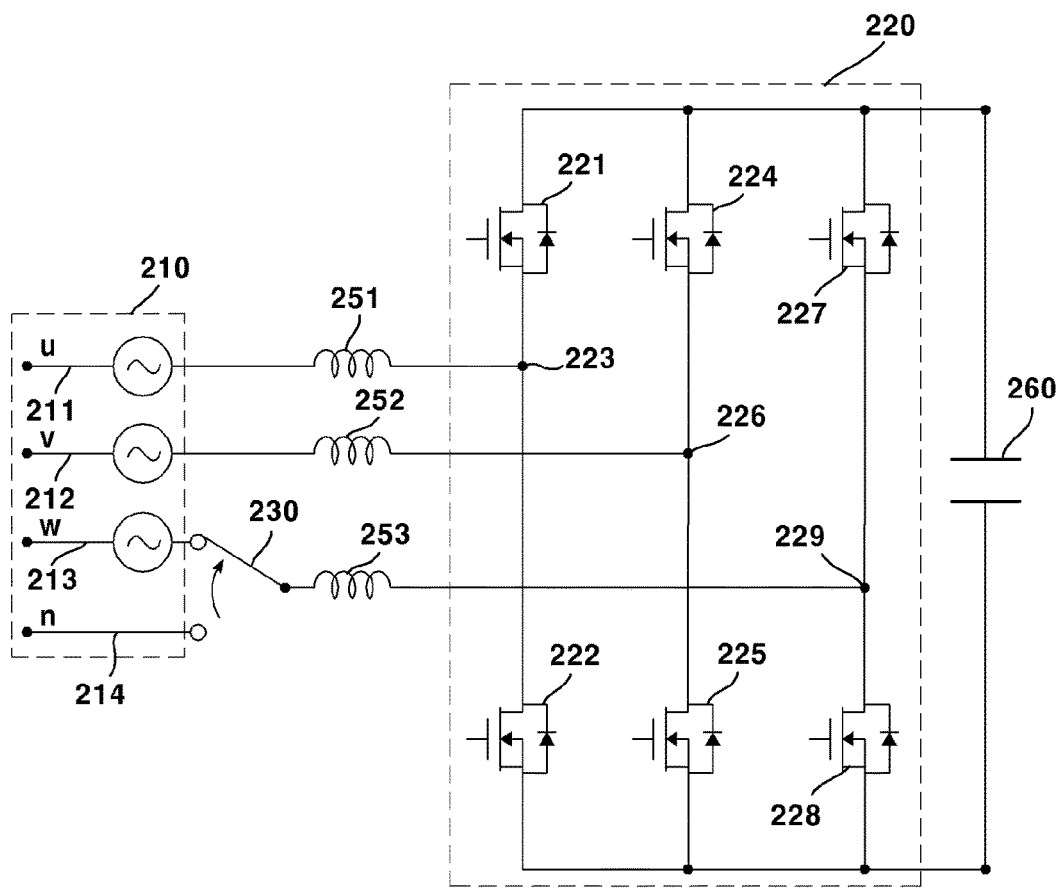
FIGS. 9 and 10 are diagrams for explaining an operation process of an AC/DC converter according to another embodiment of the present invention.

FIG. 9 is diagrams for explaining the operation of an AC/DC converter 200 when a three-phase power is inputted to the power unit 210.

When three-phase power is inputted to the power unit 210, each of the three power sources with different phases is inputted to the first power input line 211, the second power input line 212, and the third power input line 213. At this time, the switch 230 may connect any one among the power input lines 211, 212 and 213 to the main bridge circuit 220.

The input power inputted to the power unit 210 is delivered to the main bridge circuit 220 through each power input line 211, 212 and 213, and delivered to the capacitor 260 as one of the two switch elements comprising each half-bridge circuit is turned on.

For example, the first-first switch element 221 comprising the first half-bridge circuit is turned on, and the first-second switch element 222 is turned off so that the input power being inputted through the first power input line 211 is delivered to the capacitor 260 through the first-first switch element 221. The input power being inputted to the second power input line 212 and the third power input line 213 is also delivered to the capacitor 260 like the input power being inputted to the first power input line 211.

Figure 10:
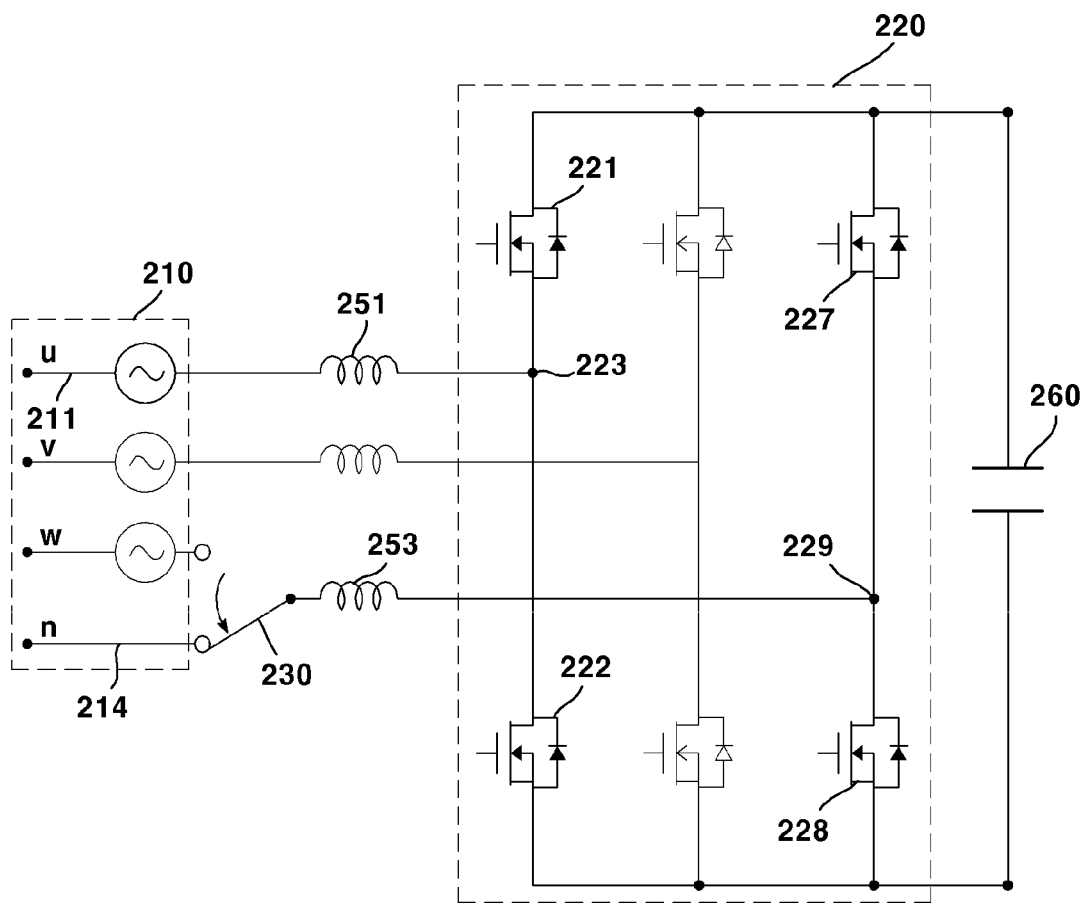

FIG. 10 is a diagram for explaining the operation of an AC/DC converter 200 when a single-phase power or a two-phase power is inputted to the power unit 210.

When a single-phase power is inputted to the power unit 210, an input power may be inputted through the first power input line 211, and when a two-phase power is inputted to the power unit 210, each of the two power supplies with different phases may be inputted to the first power input line 211 and the second power input line 212. At this time, no input power is inputted to the third power input line 213.

More specifically, FIG. 10 illustrates a case in which a single-phase power is inputted to the power unit 210, and the shaded part is a part not operating because an input power is not inputted.

When a single-phase power is inputted to the power unit 210, it is delivered to the main bridge circuit 220 through the first power input line 211, and one of the two switch elements comprising the first half-bridge circuit is turned on and it is delivered to the capacitor 260. The power passing through the capacitor 260 is delivered to the neutral line 214 through the switch 230 connected to the third node 229 as one of the two switches comprising the third half-bridge circuit is turned on. At this time, since the switch 230 is connected to the neutral line 214, power may flow to the neutral line 214.

For example, the input power inputted to the first power input line 211 flows to the first node 223, the first-first switch element 221 comprising the first half-bridge circuit is turned on, and the first-second switch element 222 is turned off so that the input power input through the first power input line 211 is transferred to the capacitor 260 through the first-first switch element 221. After that, the third-first switch element 227 comprising the third half-bridge circuit is turned off, and the third-second switch element 228 is turned on so that the power passing through the capacitor 260 sequentially passes through the third-second switch element 228, the third node 229, the switch 230, and the neutral line 214. At this time, since the switch 230 is connected to the neutral line 214, power flows to the neutral line 214.

That is, when a single-phase power is inputted to the power unit 210, an AC/DC converter 200 according to another embodiment of the present invention may increase the power density and power efficiency since it operates using two half-bridge circuits, thereby reducing the voltage that one half-bridge has to handle.

As described above, in the present invention, specific matters such as specific components, and the like; and limited embodiments and drawings have been described, but these are only provided to help a more general understanding of the present invention, and the present invention is not limited to the above embodiments, and various modifications and variations are possible from these descriptions by those of ordinary skill in the art to which the present invention belongs.

Therefore, the spirit of the present invention should not be limited to the described embodiments, and not only the claims to be described later, but also all those with equivalent or equivalent modifications to the claims will be said to belong to the scope of the spirit of the present invention.

The invention claimed is:

1. An AC/DC converter comprising:
a power unit comprising a plurality of power input lines;
a main bridge circuit being inputted with an input power via the power unit;
a relay connected in parallel to both ends of any one of the power input lines; and
a control unit configured to control opening/closing of the relay on the basis of a type of the input power,
wherein the main bridge circuit comprises a plurality of half-bridge circuits each connected to the power input lines, respectively,
wherein the relay is connected to a power input line not being inputted with an input power among the plurality of power input lines when a single-phase power is inputted to the power unit,
wherein the relay becomes closed when the single-phase power is inputted to the power unit, and
wherein the control unit controls a first half-bridge circuit connected to the power input line being inputted with the input power and a second half-bridge circuit connected to the relay among the plurality of half-bridge circuits.

2. The AC/DC converter according to claim 1, wherein the power unit comprises an AC/DC converter comprising three power input lines.

3. The AC/DC converter according to claim 1, wherein the relay becomes open when a three-phase power is inputted to the power unit.

4. The AC/DC converter according to claim 1, wherein each of the plurality of half-bridge circuits comprises two switch elements connected in series and a node connected between the two switch elements, and wherein the plurality of half-bridge circuits are connected in parallel to each other.

5. The AC/DC converter according to claim 4, comprising:
a plurality of inductors connected between each node of the plurality of half-bridge circuits and the power input line.

6. The AC/DC converter according to claim 5, comprising:
a capacitor connected in parallel to the main bridge circuit.

7. The AC/DC converter according to claim 1, comprising:
a filter configured to remove noise of the input power being inputted to the power unit.

* * * * *